Oct. 14, 1969     F. F. BROCKMÜLLER     3,472,130
PROCESS OF MANUFACTURING VALVED BAGS HAVING SIDE GUSSETS
FROM WEBS OF PLASTIC SHEET MATERIAL
Filed Sept. 11, 1967     4 Sheets-Sheet 1
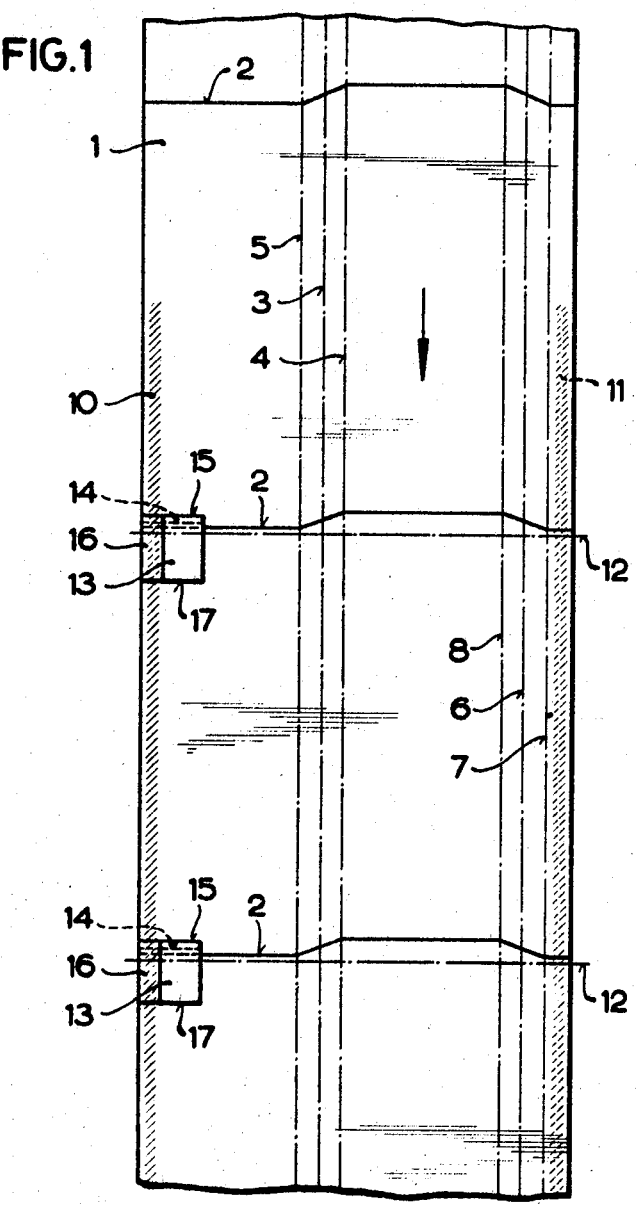
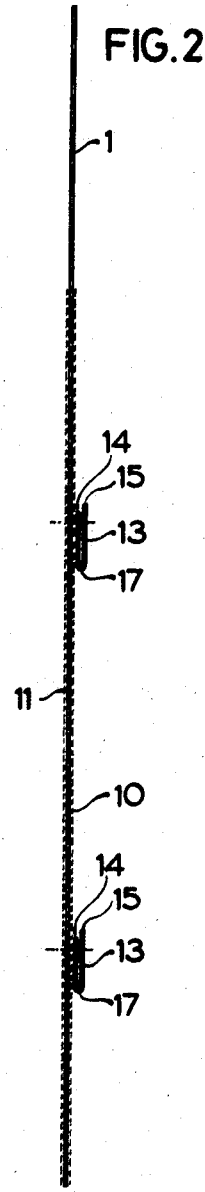
INVENTOR
FRIEDRICH F. BROCKMÜLLER
BY
*Stevens, Davis, Miller & Mosher*
ATTORNEYS Oct. 14, 1969  F. F. BROCKMÜLLER  3,472,130
PROCESS OF MANUFACTURING VALVED BAGS HAVING SIDE GUSSETS
FROM WEBS OF PLASTIC SHEET MATERIAL
Filed Sept. 11, 1967  4 Sheets-Sheet 2
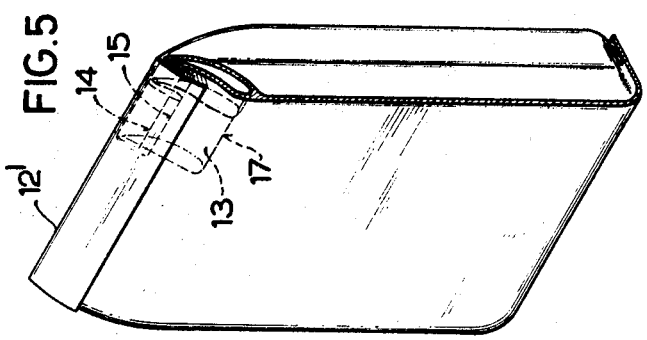
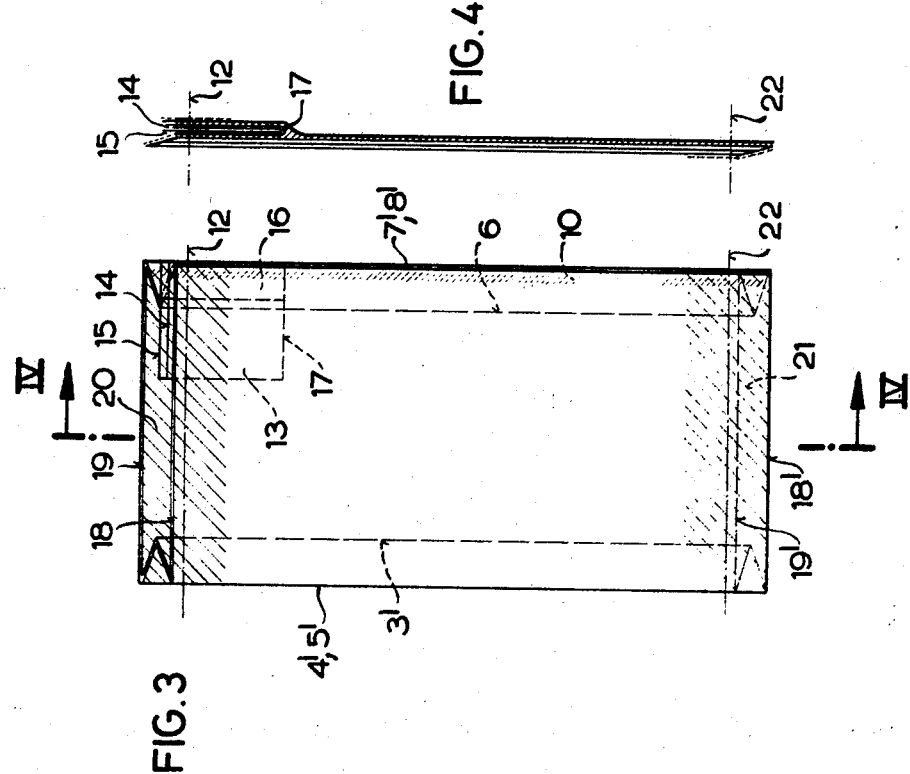
INVENTOR
FRIEDRICH F. BROCKMÜLLER
BY
*Stevens, Davis, Miller & Mosher*
ATTORNEYS

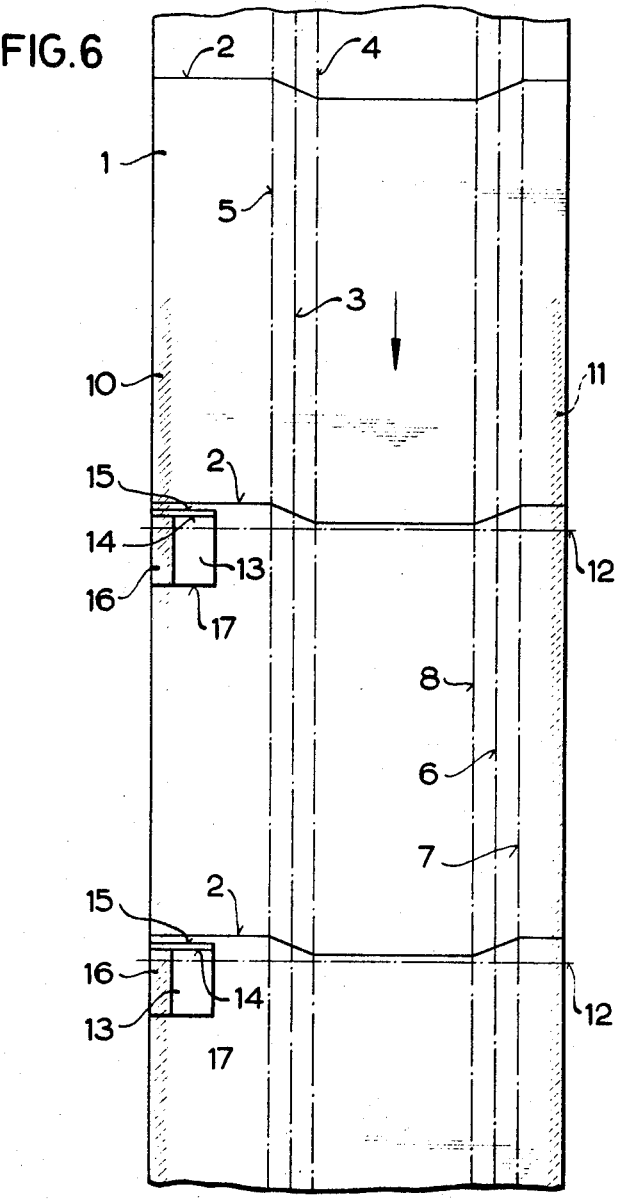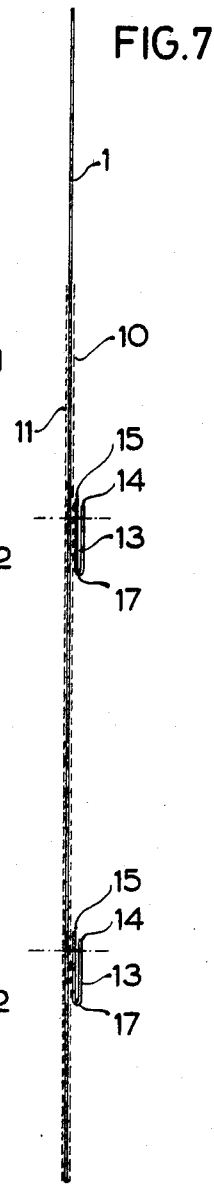

Oct. 14, 1969  F. F. BROCKMÜLLER  3,472,130
PROCESS OF MANUFACTURING VALVED BAGS HAVING SIDE GUSSETS
FROM WEBS OF PLASTIC SHEET MATERIAL
Filed Sept. 11, 1967  4 Sheets-Sheet 4
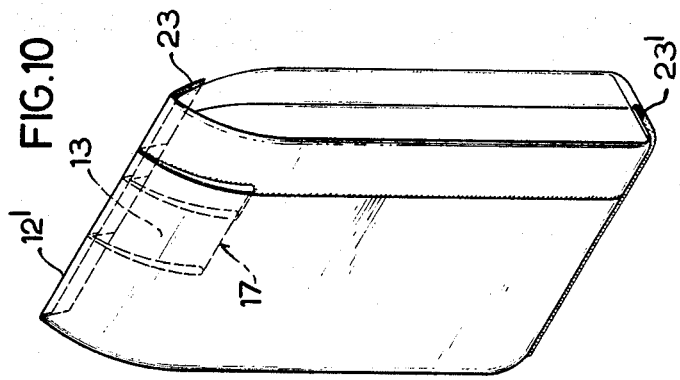
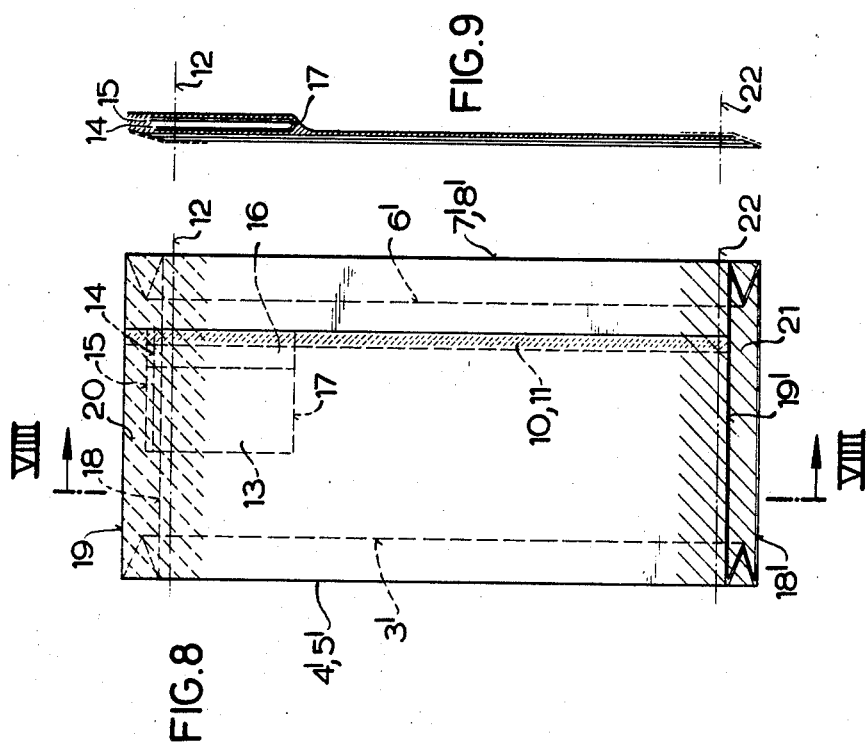
INVENTOR
FRIEDRICH F. BROCKMÜLLER
BY
ATTORNEYS

United States Patent Office 3,472,130
Patented Oct. 14, 1969

3,472,130
PROCESS OF MANUFACTURING VALVED BAGS HAVING SIDE GUSSETS FROM WEBS OF PLASTIC SHEET MATERIAL
Friedrich Franz Brockmüller, Lengerich, Westphalia, Germany, assignor to Windmöller & Hölscher, Lengerich, Westphalia, Germany
Filed Sept. 11, 1967, Ser. No. 666,775
Claims priority, application Germany, Sept. 21, 1966, W 42,449; Jan. 25, 1967, W 43,223
Int. Cl. B39d 49/04
U.S. Cl. 93—35          5 Claims

ABSTRACT OF THE DISCLOSURE

Continuous, transverse lines of weakness are formed in a single-ply web of plastics material and are relatively staggered in the longitudinal direction of the web on those web portions which are intended to form the forward and rear walls of the bags. A continuous band of adhesive is applied in the longitudinal direction along one edge of the web on one side of the sheeting and an adhesive coating is provided on the other side of the sheeting along the other edge of the web at least in each area to be occupied by a valve. Valve patches of plastics material are reversely folded about a fold line extending at right angles to the longitudinal direction of the web and are applied to the adhesive coatings in such a manner that the edges of such patches on one side thereof are aligned with the side edge of the web and the free end edges of their two plies are staggered relative to each other and to the associated transverse line of weakness. The web is formed into a tubing having side gussets in that the side parts are reversely folded, the side gussets are tucked in and the longitudinal edges are adhesively joined. Tube sections are torn along the lines of weakness from the tubing having side gussets. The ends of the tube sections are provided on the staggered side with an adhesive coating which extends over the inside of the longer ply and the outside of the shorter ply. The two plies of the tube section are reversely folded about fold lines which are closely spaced from the free edge of the shorter ply and the reversely folded portions are adhesively joined to the outside of the shorter ply.

It is already known to make valved bags from single-ply plastic sheeting webs by heat-sealing reversely folded valve patches along one edge of the web at points which are spaced apart by the desired bag length, whereafter the web is folded to form a tubing, the edges of the web are joined by a heat-sealed longitudinal seam, which incorporates the valve patches, and heat-sealed transverse seams are formed, which extend transversely to the longitudinal direction of the web and embrace the free edges of the reversely folded valve patches and close the same to form a valve tube while a bag is formed at the same time. Such heat-sealed bags of plastics material have various disadvantages in their manufacture and use. Specifically, the material is always weakened by a change in its structure at the heat-sealed seams so that the bag may become torn open at these points by rough handling.

It is an object of the invention to provide a process of manufacturing simple valved bags having side gussets from plastics material sheeting, in which process the bags are made with adhered joints made with the aid of commercial adhesives for plastics material so that the advantages of the known process are substantially retained whereas its disadvantages are avoided.

In the process proposed to accomplish this object in the manufacture of adhesively joined valved bags having side gussets and made from single-ply webs of plastics material sheeting, (1) Continuous, transverse lines of weakness are formed in a single-ply web of plastics material and are relatively staggered in the longitudinal direction of the web on those web portions which are intended to form the forward and rear walls of the bags;

(2) A continuous band of adhesive is applied in the longitudinal direction along one edge of the web on one side of the sheeting and an adhesive coating is provided on the other side of the sheeting along the other edge of the web at least in each area to be occupied by a valve;

(3) Valve patches of plastics material are reversely folded about a fold line extending at right angles to the longitudinal direction of the web and are applied to the adhesive coatings in such a manner that the edges of such patches on one side thereof are aligned with the side edge of the web and the free end edges of their two plies are staggered relative to each other and to the associated transverse line of weakness;

(4) The web is formed into a tubing having side gussets in that the side parts are reversely folded, the side gussets are tucked in and the longitudinal edges are adhesively joined;

(5) Tube sections are torn along the lines of weakness from the tubing having side gussets;

(6) The ends of the tube sections are provided on the staggered side with an adhesive coating which extends over the inside of the longer ply and the outside of the shorter ply; and (7) The two plies of the tube sections are reversely folded about fold lines which are closely spaced from the free edge of the shorter ply and the reversely folded portions are adhesively joined to the outside of the shorter ply.

The process according to the invention is a development of a known process of manufacturing valveless bags having side gussets from paper, in which process the tubing is formed so that the forward and rear plies have staggered cut edges and the ends are formed by reversely folding and adhesively joining the resulting flaps (U.S. patent specification No. 3,203,620). The process disclosed there has been developed according to the invention so as to be applicable to the manufacture of adhesively joined valved bags having side gussets from single-ply webs of plastics material sheeting. Owing to the special insertion and arrangement of the reversely folded valve patches, the valve tube is formed during the reverse folding and adhesive joining of parts of the sheeting without need for additional steps because each of the two plies of the reversely folded valve patch is provided with an adhesive coating and is adhesively co-joined during the adhesive joining of the end flap of the bag.

In a development of the invention, the valve patches may be provided with reinforcements along those edges which are aligned with the side edge of the web and these reinforcements may serve for reinforcing the filling opening. It will be particularly desirable if such reinforcements are formed by a reverse folding in the longitudinal direction of the web which serves for making the valves.

In an embodiment of the invention, the distance of the transverse lines of weakness from the subsequent flap fold line is smaller adjacent to the edges of the web than in the middle of the web and the valve patches are applied to the adhesive coating at the web edge in such a manner that the free end edge of that ply of the valve patch which is adhesively joined to the web protrudes somewhat over the respective line of weakness whereas the free end edge of the other ply protrudes somewhat over the end edge of the adhesively joined ply. It is more desirable, however, to employ another embodiment of the invention, in which the distance from the transverse lines of weakness to the subsequent flap fold line is larger adjacent to the web edges than in the middle of the web and the valve patches are applied to the adhesive coating at the web edge in such a manner that their free end edges protrude over an imaginary prolongation of the middle portion of the transverse line of weakness whereas they do not protrude over the outer part of such line of weakness, and the free end edge of that ply of the valve patch which is adhesively joined to the web protrudes over the free end edge of the other ply. In the bag which has been made by the process according to the invention in its first embodiment, the longitudinal seam and with it the valved filling opening can be disposed only exactly at the bag edge because the valved opening would be closed by the closing flap if the seam were relocated from the bag edge onto the bag wall. This disadvantage is eliminated in the second embodiment because the design of the transverse lines of weakness and the position of the longitudinal folds for the formation of the tubing may be selected so that the adhered longitudinal seam and with it the valve are relocated to any desired extent on the bag wall which is provided with the adhered seam as the valve opening is fromed at this ply, which is longer at the valved end, and the valve opening cannot be closed by the end flap. In both embodiments, the valve extends onto the flap and is closed by the closing of the flap.

The invention will be explained more fully in the subsequent description with reference to the drawing, which basically shows the manufacture of bags in both embodiments of the process according to the invention and the final bags according to the invention. In the drawing:

FIG. 1 is a top plan view showing a sheeting web before its formation into a tubing.

FIG. 2 is a side elevation showing the web of FIG. 1.

FIG. 3 shows a tube section which has been severed from the tubing and in which a valve has been inserted whereas the ends have not yet been closed.

FIG. 4 shows the tube section of FIG. 3 in a sectional view taken on line IV—IV of FIG. 3.

FIG. 5 shows a finished bag made according to the first embodiment of the invention, with dotted lines indicating those valve parts which are not visible from the outside.

FIG. 6 is a top plan view showing a sheeting web and valve patches applied in accordance with the second embodiment of the invention before the formation of a tubing.

FIG. 7 is a side elevation showing the web of FIG. 6.

FIG. 8 shows a severed tube section before the closing of the ends.

FIG. 9 shows the tube section of FIG. 8 in a sectional view taken on line IV—IV of FIG. 8.

FIG. 10 shows the finished, filled bag according to the second embodiment of the invention.

In the process according to the invention, a sheeting web 1 moving in the direction of the arrow is first formed with transverse lines of weakness 2, which are spaced apart by the desired bag length. If the sheeting web 1 consists of a known sheeting material, which comprises two very thin sheeting layers, which have been stretched or oriented at an angle of preferably 45° to their longitudinal direction and have been joined with crossing directions of orientation, the lines of weakness may be formed according to the invention in that the sheeting web is softened with a suitable bent, hot wire. The high strength which is due to the orientation of the material is thus lost at the points where the softening results in a change of the structure of the material so that the sheeting has preformed tear lines at these points. The sheeting web 1 is subsequently folded along lines 3, 4, 5 and 6, 7, 8 in a known tube-forming device to form a tubing having side gussets 3', 4', 5' and 6', 7', 8'. Before the formation of that tubing, a longitudinally extending adhesive band 10 is applied along one longitudinal edge to the upper surface of the sheeting 1 and a longitudinally extending adhesive band 11 is applied to the underside of the sheeting along the other longitudinal edge thereof. These adhesive bands serve for the formation of the adhered longitudinal seam of the finished tubing and for the fixation of the filling valve 13. This is applied to the adhesive band 10 and adhered by the latter to the sheeting 1 when the adhesive bands have been applied and before the tubing is formed.

According to the invention, the filling valve consists of a valve patch, which is cut from a web, not shown, which moves suitably in the same direction as the sheeting web 1. The valve patch is transversely folded along the edge 17, which is so positioned on the valve patch that the cut edge 15 protrudes somewhat over the cut edge 14, as is apparent from the drawing. The valve patch which has thus been folded is so applied and adhered to the web by the adhesive band 10 that the cut edge 14 protrudes by a certain distance over the line of weakness 2. When the web is folded and the longitudinal adhesive bands 10 and 11 are joined in the formation of the tubing, the reversely folded valve patch 13 is disposed between the mutually overlapping edge portions of the sheeting web.

In known manner, the finished tubing is severed into sections by being torn along the lines of weakness 2. In this operation, that portion of the valve 13 which protrudes over the line of weakness 2 separates from the succeeding tubing end. This operation results in the formation of tubing edges 18, 19 and 18', 19', which are relatively staggered in the longitudinal direction of the tubing. The cut edges 14, 15 of valve 13 now protrude over the tubing edge 18. Besides, the edge 15 protrudes over the cut edge 14 of that ply of the valve patch which has been adhered by the adhesive band 10 to the sheeting web. As a result, the two plies of the tube section are staggered at the valved end and the two plies of the reversely folded patch 13 intended to form the valve tube are also staggered relative to each other and to the plies of the bag tube section at that end.

Before the end is closed, the adhesive coating 20 is applied, which covers the inside of the exposed portion of that tubing ply which is longer at this end and part of the outside of that tube section ply which is shorter at this end as well as those portions of the valve patch 13 which protrude over the tube section edge 18 and the cut edge 14, respectively. The tube section is then folded along line 12, which is somewhat below the tube section edge 18 so that the edge 12' is provided in the closed bag shown in FIG. 5. The adhesive coating 20 joins the protruding portions of valve patch 13 to the shorter wall of the bag so that the folding results in a valved tube which is firmly adhered to the bag walls.

To reinforce the filling opening, valve 13 may be provided with a reinforcement 16, which may be formed, e.g., by a reverse folding of an edge portion of the web from which the valve is made or by a reinforcing strip which is adhered to that web.

That end of the bag which is opposite to the valved end is formed by the application of an adhesive coating 21 to the underside of the tube section and by a reverse folding of the tube section end toward the rear along line 22.

The adhesive band 10 which serves for attaching the valve 13 may be interrupted in length and may be restricted to the area of the valve 13 which is to be attached if the adhesive band 11 is sufficient for a good joint along the longitudinal seam of the tubing.

In the illustrative embodiment shown in FIGS. 6 to 10, the same reference numbers are used as in the embodiment of FIGS. 1 to 5. Lines of weakness 2 spaced apart by the desired bag lengths are again formed in the sheeting web 1, which travels in the direction of the arrow. These lines of weakness are represented by solid lines as they are preferably formed by a fusing process, which reduces the thickness of the sheeting along line 2. Contrary to the embodiment of FIGS. 1 to 5, the transverse lines of weakness 2 are spaced from the subsequent transverse fold line 12 by a larger distance adjacent to the side edges of the web than in the middle.

In the second embodiment, the sheeting web 1 is subsequently folded along lines 3, 4, 5 and 6, 7, 8 in a specific tube-forming device to form a tubing having side gussets 3', 4', 5' and 6', 7', 8'. In this case too, the longitudinal band of adhesive 10 is applied to the upper side of the sheeting 1 along one longitudinal edge thereof and the longitudinal band 11 of adhesive is applied to the underside of the sheeting along the other longitudinal edge thereof. In this embodiment too, the valve patch 13 is applied to the adhesive band 10 and joined by the latter to the sheeting web 1 when the adhesive bands have been applied and before the tubing is formed. The filling valve consists of a patch, which is reinforced by a longitudinal fold 16 along the subsequent filling opening and which is folded along the transverse line 17 to form a half-tube. The cut edges 14, 15 of said half-tube are relatively staggered, as shown, in such a manner that the edge 14 of the shorter ply protrudes over an imaginary prolongation of the middle part of the transverse line of weakness 2 and the end edge 15 of the longer ply protrudes over the edge 14. Contrary to the first embodiment, the two plies do not protrude over the transverse line of weakness adjacent to the edges of the web.

After the formation of the tubing containing the adhered valve half-tubes 13 and the tearing off of individual tube sections, as is shown in FIG. 8, the adhesive band 20 is applied to the underside and the adhesive band 21 is applied to the upper side of the tube section at the corresponding ends and the tube section is closed by a scoring along lines 12 and 22 and by a reverse folding of the end flaps 23 and 23' in rearward and forward directions, respectively. As the end edges 14, 15 protrude beyond line 12 to a certain extent, the reverse folding of the tube section end along line 12 transforms the valve half-tube 13 into a tube. As both plies protrude also over the torn edge 18 and are positively staggered relative to each other, the valve 13 is adhered to the shorter wall of the tube section. The bag edge 12' is formed by a reverse folding of the end flap 23.

In this arrangement, the position of the longitudinal bands 10, 11 of adhesive and the adhesively joined valve 13 may be selected at any desired distance from the lateral bag edge 7' by a relocation of the fold lines 3 to 8 and a corresponding design of the lines of weakness 2 because the valve opening cannot be closed by the reverse folding of end flap 23 as the valve opening is in that tube section wall which is joined to the end flap 23.

What is claimed is:

1. A process of manufacturing adhesively joined valved bags having side gussets from single-ply webs of plastics material sheeting, characterized in that
   (1) continuous, transverse lines of weakness are formed in a single-ply web of plastics material and are relatively staggered in the longitudinal direction of the web on those web portions which are intended to form the forward and rear walls of the bags;
   (2) a continuous band of adhesive is applied in the longitudinal direction along one edge of the web on one side of the sheeting and an adhesive coating is provided on the other side of the sheeting along the other edge of the web at least in each area to be occupied by a valve;
   (3) valve patches of plastics material are reversely folded about a fold line extending at right angles to the longitudinal direction of the web and are applied to the adhesive coatings in such a manner that the edges of such patches on one side thereof are aligned with the side edge of the web and the free end edges of their two plies are staggered relative to each other and to the associated transverse line of weakness;
   (4) the web is formed into a tubing having side gussets in that the side parts are reversely folded, the side gussets are tucked in and the longitudinal edges are adhesively joined;
   (5) tube sections are torn along the lines of weakness from the tubing having side gussets;
   (6) the ends of the tube sections are provided on the staggered side with an adhesive coating which extends over the inside of the longer ply and the outside of the shorter ply; and
   (7) the two plies of the tube section are reversely folded about fold lines which are closely spaced from the free edge of the shorter ply and the reversely folded portions are adhesively joined to the outside of the shorter ply.

2. A process according to claim 1, characterized in that the valve patches are provided with reinforcements along those edges which are aligned with the side edge of the web.

3. A process according to claim 2, characterized in that the reinforcements are formed by a reverse folding in the longitudinal direction of the web which serves for making the valves.

4. A process according to claim 1, characterized in that the distance of the transverse lines of weakness from the subsequent flap fold line is smaller adjacent to the edges of the web than in the middle of the web and the valve patches are applied to the adhesive coating at the web edge in such a manner that the free end edge of that ply of the valve patch which is adhesively joined to the web protrudes somewhat over the respective line of weakness whereas the free end edge of the other ply protrudes somewhat over the end edge of the adhesively joined ply.

5. A process according to claim 1, characterized in that the distance from the transverse lines of weakness to the subsequent flap fold line is larger adjacent to the web edges than in the middle of the web and the valve patches are applied to the adhesive coating at the web edge in such a manner that their free end edges protrude over an imaginary prolongation of the middle portion of the transverse line of weakness whereas they do not protrude over the outer part of such line of weakness, and the free end edge of that ply of the valve patch which is adhesively joined to the web protrudes over the free end edge of the other ply.

References Cited

UNITED STATES PATENTS 3,254,574  6/1966  Becker _____ 93—35
3,279,330  10/1966  Harding _____ 93—35

BERNARD STICKNEY, Primary Examiner

U.S. Cl. X.R.

229—62.5